Dec. 23, 1947.  E. J. DE NORMANVILLE  2,433,099
CONTROL MEANS FOR VARIABLE SPEED VEHICLE DRIVING MECHANISMS
Filed Jan. 28, 1944  5 Sheets-Sheet 1

Inventor
E. J. De Normanville

Inventor
E. J. De Normanville

Dec. 23, 1947.  E. J. DE NORMANVILLE  2,433,099
CONTROL MEANS FOR VARIABLE SPEED VEHICLE DRIVING MECHANISMS
Filed Jan. 28, 1944  5 Sheets-Sheet 3

Inventor
E. J. DeNormanville
By Glascock Downing & Seebold
Attys

Dec. 23, 1947.  E. J. DE NORMANVILLE  2,433,099
CONTROL MEANS FOR VARIABLE SPEED VEHICLE DRIVING MECHANISMS
Filed Jan. 28, 1944  5 Sheets-Sheet 5

Inventor
E. J. De Normanville

Patented Dec. 23, 1947

2,433,099

UNITED STATES PATENT OFFICE 2,433,099

CONTROL MEANS FOR VARIABLE-SPEED VEHICLE DRIVING MECHANISMS

Edgar Joseph de Normanville, Hatch End, England

Application January 28, 1944, Serial No. 520,094
In Great Britain February 6, 1943

2 Claims. (Cl. 74—337.5)

This invention relates to means for controlling the variable speed driving mechanisms used on road vehicles, including military tanks, agricultural tractors, or the like, the mechanisms being of the epicyclic or other types having combined with them hydraulic, pneumatic, or electrical mechanisms for effecting the required changes from one speed ratio to another. The object of the invention is to provide simple control means whereby the changes can be effected either by the driver or automatically in response to changes in the speed of the vehicle.

The invention comprises essentially the combination of a cam (or a plurality of cams) which (or each of which) has both rotational and axial freedom of movement and is adapted to actuate a valve or switch (or a plurality of such parts) associated with the ratio-changing mechanisms, means operable by the driver for actuating the cam in one of its modes of freedom, and means responsive to the speed of the vehicle for actuating the cam in its other mode of freedom.

Further, the invention may also comprise the combination with means as specified in the preceding paragraph, of additional means for actuating the cam in one of its modes of freedom in response to movements of the accelerator pedal.

In the accompanying sheets of explanatory drawings—

Figure 1:
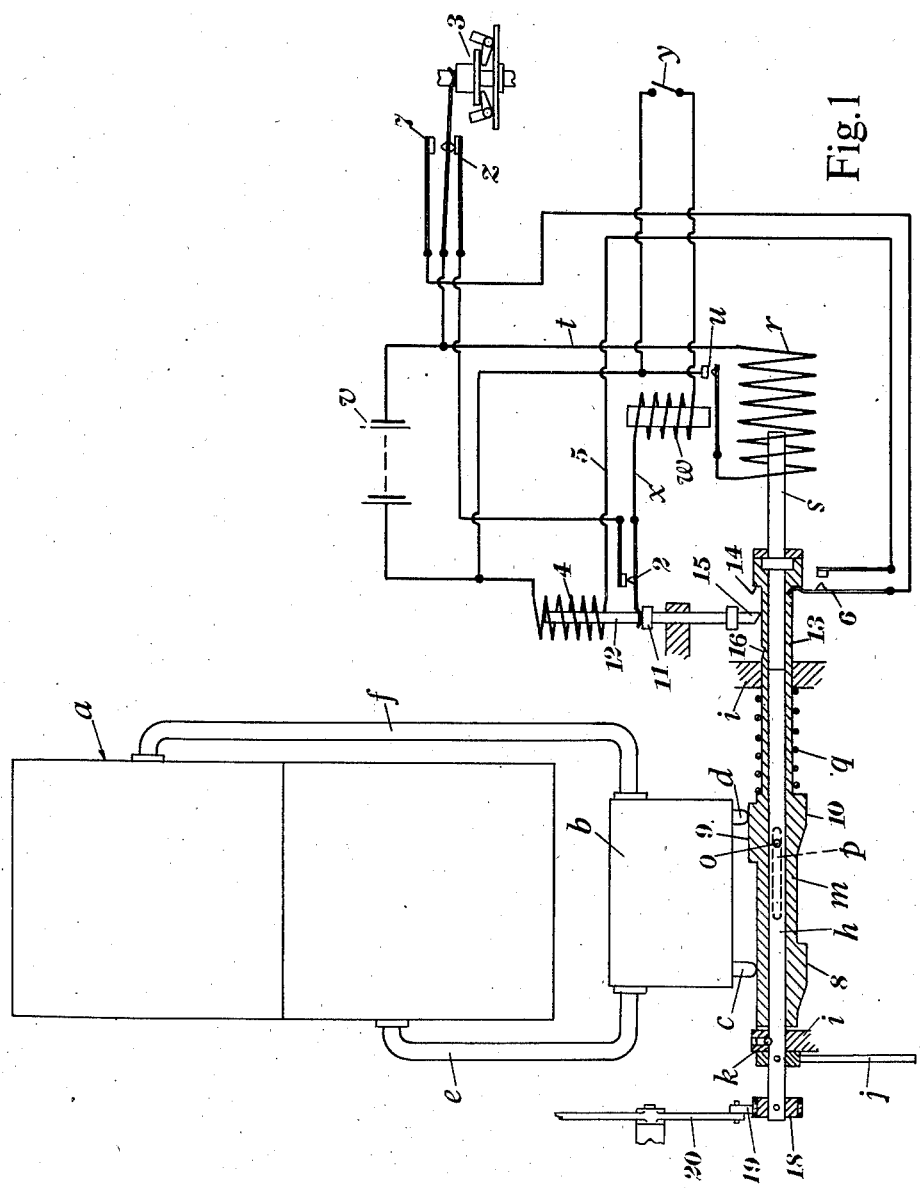
Figure 1 is a part sectional diagram illustrating control means in accordance with the invention.
Figure 3:
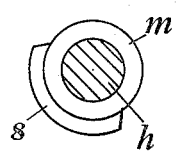
Figures 3 and 4 are opposite end views, illustrating to a larger scale the cam and associated parts of the control means shown in Figure 1.

To elucidate the essential features of my invention I will described its application to a known form of four-speed epicyclic mechanism having hydraulic (or pneumatic) controls, and comprising a pair of selectively controllable two-speed gears arranged in series. Such a mechanism is described in the specification of my U. S. Patent No. 2,349,410 and is indicated as a whole by $a$ in Figure 1. The control means defined by the following description is applicable to the mechanism described in the said specification. Variation of the speed-ratio of the mechanism $a$ is effected by fluid pressure in response to actuation of any convenient spring loaded valves contained in a casing $b$, the valves being operable by axially movable stems $c$, $d$ which project from the casing. The latter is connected to the mechanism $a$ by pipes $e$, $f$ through which fluid for varying the speed-ratio of the mechanism can flow under the control of the valves. Inward movements of the valve-operating stems $c$, $d$ serve to establish communication between the pipes $e$, $f$ and any convenient source of pressure fluid. Return movements of the valve-operating stems $c$, $d$ serve to interrupt communication between the pipes $e$, $f$ and the source of fluid pressure, and allow fluid in the pipes to be discharged to any convenient sump. The first speed-ratio of the mechanism $a$ is obtained when the stem $c$ is in its outer position and the stem $d$ in its inner position, this being the condition shown in Figure 1. The second speed-ratio is obtained when both of the stems $c$, $d$ occupy their outer positions. The third speed-ratio is obtained when both stems $c$, $d$ are in their inner positions. The fourth or top speed-ratio is obtained when the stem $c$ is in its inner position and the stem $d$ in its outer position. It is usual to employ the first speed-ratio for emergency starting purposes only, the second speed-ratio being employed for ordinary starting purposes. Town driving is done mostly on the second and third speed-ratios, the fourth speed-ratio being used only or mainly when travelling on an open road at relatively high speed.

In applying the invention as shown in Figures 1 to 13 to the mechanism above described, I employ a shaft $h$ which is supported by a fixed bearing or bearings $i$, and which is angularly movable about its axis to any of four predetermined positions by means of a small hand lever $j$, the shaft having associated with it a spring-loaded detent $k$ for holding it against accidental movement from the position to which it has been moved by the hand lever, and the latter having associated with it (if desired) a guide quadrant (not shown). On the shaft $h$ is slidably mounted a cam $m$ in the form of a sleeve. The cam $m$ is connected to the shaft $h$ by a transverse pin $o$ which passes through a diametrical hole in the shaft and engages longitudinal slots as $p$ in the cam, so that the cam is slidable relatively to but is angularly movable with the shaft. The cam $m$ is slidable along the shaft $h$ in one direction by a spring $q$ surrounding the shaft, and in the opposite direction by a solenoid $r$, the latter having a movable core $s$ which is connected to the cam in any convenient manner, and being controlled by the speed of the vehicle in the manner hereinafter described.

The solenoid $r$ is arranged in a circuit $t$ containing a normally open spring-loaded switch $u$ and a battery $v$. The switch $u$ is responsive to an electromagnetic relay $w$ arranged in a circuit $x$ containing the battery $v$ and three additional switches $y$, $z$, $2$, the switches $z$, $2$ being spring-loaded. When the switches $y$, $z$, $2$ are closed the relay $w$ is energised and closes the switch $u$ in the circuit $t$ of the solenoid $r$. The switch $y$ is the engine ignition switch. The switch $z$ is responsive to a centrifugal or other governor $3$ the action of which depends on the speed of the vehicle. The switch $2$ is responsive to another solenoid $4$ in a circuit $5$ containing the battery $v$ and two further spring-loaded switches $6$, $7$, the switch $6$ being responsive to the axial movement of the cam $m$, and the switch $7$ being responsive to the governor $3$. Further, the governor-responsive switches $z$, $7$ are arranged so that when the vehicle is moving at less than a predetermined speed the switch $z$ is closed and the switch $7$ open, but when the vehicle exceeds the predetermined speed the switch $z$ is opened and the switch $7$ closed. To enable this to be effected the switches $z$, $7$ may be formed by a single two-way switch having its movable part responsive to the governor $3$, but for clarity of description they will be referred to hereinafter as separate switches.

As previously indicated the cam $m$ has two modes of freedom, namely, axial freedom relatively to the shaft $h$ and rotational freedom with the shaft. Moreover, the cam $m$ is so shaped and arranged that it can by movements in either of these modes serve to actuate the valve-operating stems $c$, $d$ for varying the speed-ratio of the mechanism $a$. Automatic actuation of the cam $m$ is mainly desirable in connection with the second, third, and fourth speed-ratios of the mechanism $a$, and I therefore arrange for both hand and automatic control of these three ratios, and hand control only of the first speed-ratio.

As shown the cam $m$ is of cylindrical shape and is formed near one end with a peripheral protuberance $8$ and at or near the other end with a pair of diametrically opposite peripheral protuberances $9$, $10$. The first speed-ratio of the mechanism $a$ is obtainable when the cam $m$ occupies the angular position shown in Figures 1 and 2. In this position of the cam the valve-operating stem $c$ is in its outer position in which it bears on the main cylindrical periphery of the cam, and the other valve-operating stem $d$ is in its inner position in which it bears on the cam protuberance $9$. The second speed-ratio is obtained when the cam $m$ occupies the angular position shown in Figure 5. In this position of the cam both of the valve-operating stems $c$, $d$ occupy their outer positions in which they bear on the main cylindrical periphery of the cam. The third speed-ratio is obtained when the cam $m$ is in the position shown in Figure 8. In this position of the cam the valve-operating stems $c$, $d$ are in their inner positions in which they bear on the cam protuberances $8$ and $10$ respectively. The fourth speed-ratio is obtained when the cam $m$ occupies the position shown in Figure 11. In this position of the cam the valve-operating stem $c$ is in its inner position in which it bears on the cam protuberance $8$, and the other valve-operating stem $d$ is in its outer position in which it bears on the main cylindrical periphery of the cam.

To facilitate explanation it will be assumed that the vehicle is stationary, and that the cam $m$ is in the extreme axial position shown in Figure 1 to which it is movable by the spring $q$. In this condition the relay-responsive switch $u$ is held open by its spring loading. Also the governor-responsive switch $z$ is held closed by its spring-loading, the other governor-responsive switch $7$ being open. Moreover the solenoid-responsive switch $2$ is held closed against the action of its spring loading by a collar $11$ on an axially slidable rod $12$ which at one end is supported by a cylindrical extension $13$ of the cam $m$, the other end of this rod being adapted to form or secured to a movable core of the solenoid $4$. Further the cam-responsive switch $6$ is held open against the action of its spring loading by a shoulder $14$ on the cam extension $13$.

If the vehicle is started with the cam $m$ in the position shown in Figure 1, the first speed-ratio of the mechanism $a$ is obtained. The closing of the engine ignition switch $y$ by the driver in the starting operation completes the circuit $x$ containing the relay $w$ and the switches $z$, $2$. Current from the battery $v$ now flows through the circuits $x$ and energises the relay $w$. The effect of the energised relay $w$ is to close the switch $u$ and complete the circuit $t$ containing the solenoid $r$, causing the latter to be energised. The cam $m$ is now moved by the solenoid $r$ against the action of the spring $q$ to the other extreme axial position shown in Figure 2, and is retained in this position by the engagement of a detent $15$ on the adjacent end of the rod $12$ with a complementary recess $16$ in the cam extension $13$, the rod being moved axially to effect such engagement with the assistance of the spring-loaded switch $2$ which opens automatically when the rod is allowed to move in the appropriate direction by virtue of the recess in the cam extension. Opening of the switch $2$ breaks the circuit $x$ containing the relay $w$, whereupon the switch $u$ opens and breaks the circuit $t$ containing the solenoid $r$, but the cam $m$ is prevented from returning to its initial position under the action of the spring $q$ by the engagement of the detent $15$ with the recess $16$ in the cam extension $13$.

Figure 2:
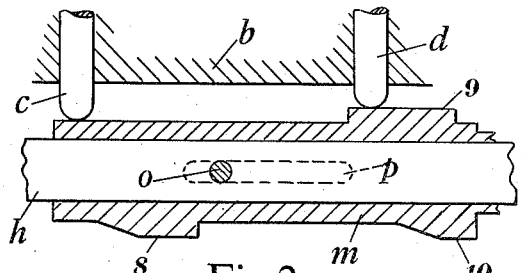
Figure 2 is a sectional side view.
Figure 4:
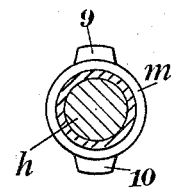
Figure 6:
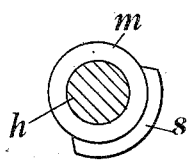
Figures 5 to 7, 8 to 10 and 11 to 13 are respectively similar views to Figures 1 to 3 illustrating the cam in three other positions.

From a comparison of Figures 1 and 2 it will be seen that the above described axial movement of the cam $m$ has no effect on the valve-operating stems $c$, $d$. It should be noted, however, that this movement enables the switch $6$ to close under the action of its spring loading.

Figure 5:
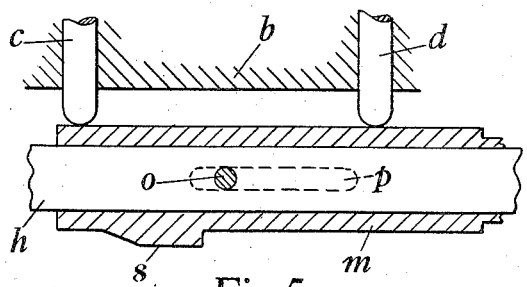
Figure 7:
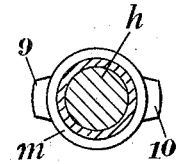
Figure 9:
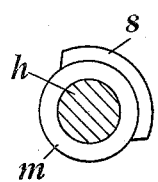

When it is required to change from the first to the second speed-ratio of the mechanism $a$, the cam $m$ is moved by the hand lever $j$ to the angular position shown in Figure 5. If the speed of the vehicle now exceeds a predetermined limit the governor $3$ opens the switch $z$ and closes the switch $7$, whereupon the solenoid $4$ is energized and returns the rod $12$ to its initial position in which the switch $2$ is closed and the detent $15$ is disengaged from the recess $16$ in the cam extension $13$. The cam $m$ is now returned by the spring $q$ to its other extreme axial position, and by opening the switch $6$ breaks the circuit $5$ containing solenoid $4$.

Figure 8:
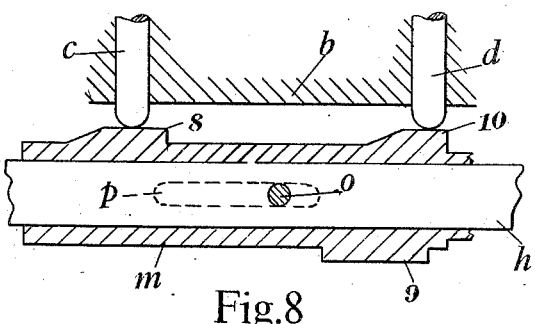
Figure 10:
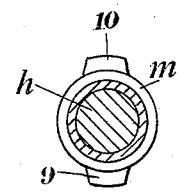
Figure 12:
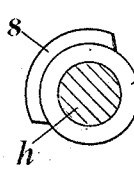

If it is now required to change from the second to the third speed-ratio of the mechanism $a$, the cam $m$ is moved by the hand lever $j$ to the position shown in Figure 8, causing the valve-operating stems $c$, $d$ to be moved to their inner positions by the cam protuberances $8$, $10$. With the hand lever $j$ retained in the position corresponding to the third speed-ratio, this ratio remains effective so long as the speed of the vehicle exceeds the said limit. But in the event of the speed of the vehicle falling below this limit the governor 3 allows the switch 7 to open and the switch 2 to close, whereupon the relay $w$ is energised with the result that the cam $m$ is again moved by the solenoid $r$ against the action of the spring $q$ to the extreme axial position shown in Figure 5. During this movement of the cam the valve-operating stems $c$, $d$ are allowed by the cam protuberances 8, 10 to move into their outer positions and thereby cause the speed-ratio of the mechanism $a$ to change back from third to second. When the speed of the vehicle again exceeds the said limit, the cam $m$ is returned as above described to its initial extreme axial position, causing the valve-operating stems $c$, $d$ to be moved to their inner positions by the cam protuberances 8, 10 so as to re-instate the third speed-ratio of the mechanism $a$.

Figure 11:
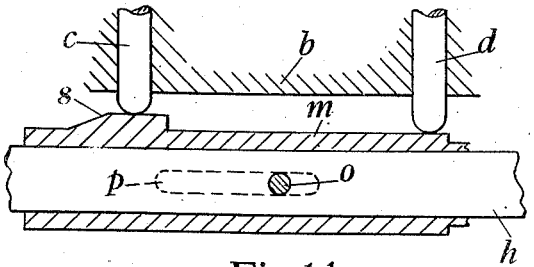
Figure 13:
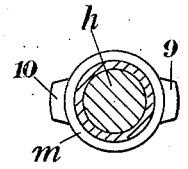
Figure 14:
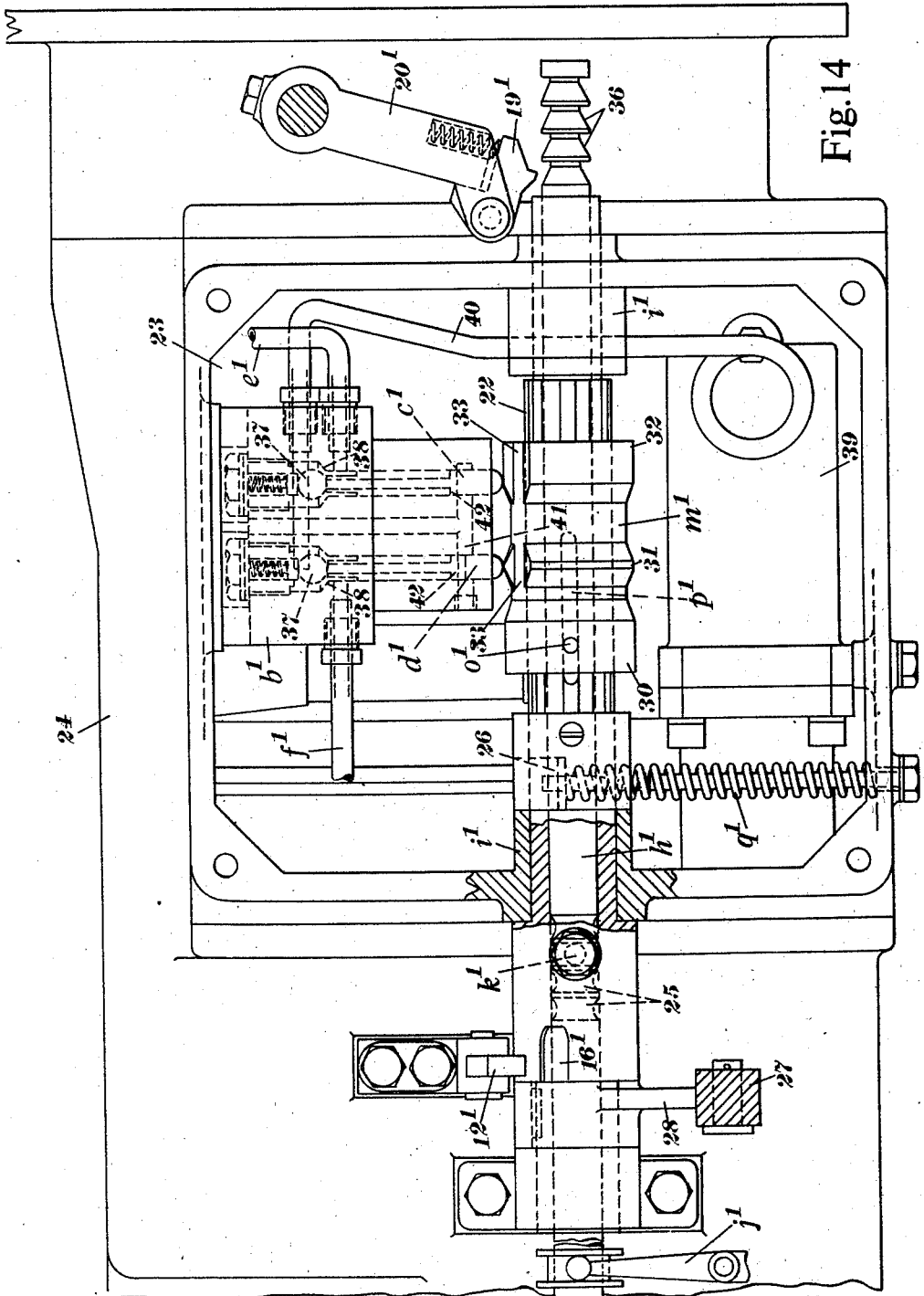
Figure 14 is a part sectional side elevation with a cover plate removed.
Figure 15:
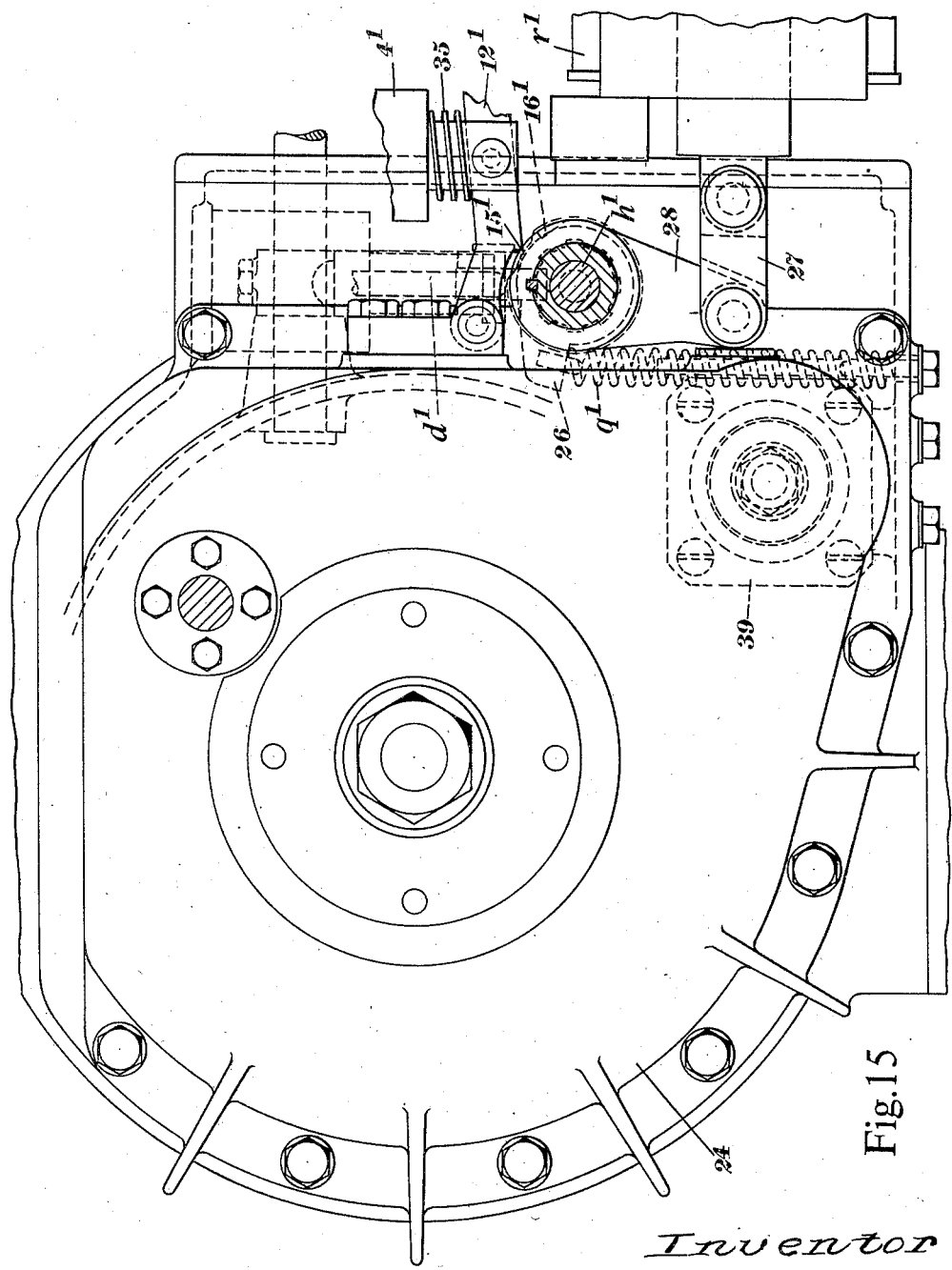
Figure 15 is a part sectional end elevation, of a modified form of the invention.

If it is now required to change the speed-ratio of the mechanism $a$ from third to fourth, the cam $m$ is moved by the hand lever $j$ to the position shown in Figure 11, allowing the valve stem $d$ to move to its outer position. With the hand lever $j$ retained in the position corresponding to the fourth speed-ratio, this ratio remains effective so long as the speed of the vehicle exceeds the above mentioned limit. But in the event of the speed of the vehicle falling below this limit, the cam $m$ is again moved axially as above described to the extreme position shown in Figure 5. During this movement of the cam the valve-operating stem $c$ is allowed by the cam protuberance 8 to move into its outer position and thereby cause the speed-ratio of the mechanism $a$ to change back from fourth to second.

It will be apparent from the foregoing description that with the hand lever $j$ set in the position corresponding to the third speed-ratio of the mechanism $a$, the speed-ratio of this mechanism can be changed automatically from the third to the second and vice versa in response to the speed of the vehicle.

As indicated above it is usual to employ the second speed-ratio of the mechanism $a$ for starting the vehicle, the first speed-ratio being used for emergency purposes only. As, moreover, the second speed-ratio is obtainable in the manner indicated above when the hand lever $j$ is in the position corresponding to the third speed-ratio, it follows that the hand lever can be set in this position prior to the vehicle being started. In this case the second speed-ratio is effective when the vehicle is being started and persists until the speed of the vehicle exceeds a predetermined limit, whereupon the third speed-ratio will be brought into action automatically. Subsequent changes between the third and second speed-ratios can be effected automatically in response to the speed of the vehicle.

In addition to the foregoing I arrange also for what is commonly known as "kick-down" gear changing in response to movements of the accelerator pedal beyond the normal "full throttle" position. For this purpose there is secured on the shaft $h$ (Figure 1) a ratchet wheel 18, which is engageable by a spring-loaded pawl 19 pivoted on one end of a lever 20. This lever 20 is operable by the above mentioned movements of the accelerator pedal (not shown), and the arrangement is such that the pawl 19 can serve to impart step-by-step angular movements to the cam $m$ through the ratchet wheel 18 and shaft $h$ in response to movements of the lever, these movements being such that changing down from any speed-ratio to a lower one can be effected through the accelerator pedal. It will be understood that the pawl 19 is normally disengaged from the ratchet wheel 18 so as not to interfere with the movements of the cam $m$ by the hand lever $j$.

Instead of utilizing the axial mode of freedom of the cam for automatic control and the rotational mode for hand control the reverse condition may be employed, a preferred form of the invention embodying this modification being shown in Figures 14 to 19 in which parts similar or analogous to those shown in Figures 1 to 13 are indicated by the same reference characters suffixed by 1.

In the example shown in Figures 14 to 19 I employ a hollow shaft 22 which is rotatably supported by but held against axial movement relatively to fixed bearings $i^1$ at opposite sides of a chamber 23 through which the shaft extends, the chamber being provided on one side of a casing 24 containing the four-speed epicyclic mechanism to be controlled. This epicyclic mechanism is similar to that indicated by $a$ in the example previously described. Supported by and extending through the hollow shaft 22 is another shaft $h^1$ which is movable axially to any of four predetermined positions by a hand lever $j^1$, the hollow outer shaft having associated with it a spring-loaded detent $k^1$ adapted by engagement with circumferential grooves 25 in the inner shaft to hold the latter against accidental movement from the positions to which it is moved by the hand lever. On the portion of the hollow outer shaft 22 within the chamber 23 is slidably splined a cam $m^1$ in the form of a sleeve, this cam being connected to the inner shaft $h^1$ by a transverse pin $o^1$ which passes through longitudinal slots as $p^1$ in the outer shaft, so that the cam is slidable relatively to the outer shaft under the action of the inner shaft. The outer shaft 22 and the cam $m^1$ are movable angularly about their axis in one direction by a compression spring $q^1$ which acts on a short laterally projecting arm 26 secured to the outer shaft, and in the opposite direction by a solenoid $r^1$, the movable core of the latter being connected by a link 27 to another short laterally projecting arm 28 secured to the outer shaft. The solenoid $r^1$ is controlled by the speed of the vehicle through the medium of a centrifugal or other governor in a similar manner to the corresponding solenoid of the example previously described.

The cam $m^1$ is of cylindrical shape and has formed on or secured to its periphery three circumferential projections 30, 31 and 32. The projection 30 extends completely around the cam, and each of the other projections 31, 32 extends almost completely around the cam, the two ends of each of the latter projections being separated by a gap 33, and the two gaps being substantially in alignment with each other. Also the adjacent sides of the three projections 30–32 and the ends of the projections 31, 32 are inclined as shown. As in the previous example the cam $m^1$ serves to actuate valve-operating stems $c^1$, $d^1$. The first speed-ratio of the epicyclic mechanism to be controlled is obtained when the cam $m^1$ occupies the axial position shown in Figure 16. In this position of the cam the valve-operating stem $c^1$ is in its outer position in which it bears on the cylindrical portion of the cam between the projections 31, 32, and the other valve-operating stem $d^1$ is in its inner position in which it bears on the cam projection 30. The second speed-ratio is obtained when the cam $m^1$ occupies the axial position shown in Figure 17. In this position of the cam both of the valve-operating stems $c^1$, $d^1$ occupy their outer positions in which they bear on portions of the cam periphery between its projections. The third speed-ratio is obtained when the cam $m^1$ is in the axial position shown in Figures 14 and 18. In this position of the cam the valve-operating stems $c^1$, $d^1$ are in their inner positions in which they bear on the cam projections 32 and 31 respectively. The fourth speed-ratio is obtained when the cam $m^1$ occupies the axial position shown in Figure 19. In this position of the cam the valve-operating stem $c^1$ is in its inner position in which it bears on the cam projection 32, and the other valve-operating stem $d^1$ is in its outer position in which it bears on the portion of the cam periphery between the projections 31 and 32.

Figure 16:
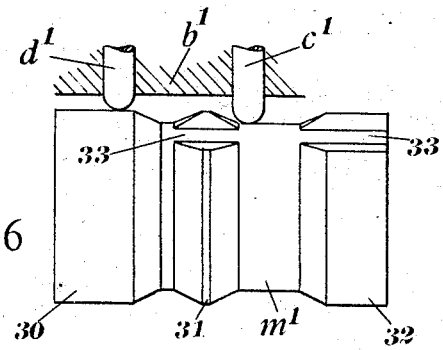
Figures 16 to 19 are similar side views illustrating in four different positions the cam and associated parts of the means shown in Figures 14 and 15.

Assuming that the vehicle is started with the first speed-ratio in action, that is to say, with the cam $m^1$ in the position shown in Figure 16, the closing of the engine ignition switch by the driver in the starting operation causes the solenoid $r^1$ to be energised under the control of a relay (not shown) as in the previously described example. The cam $m^1$ is now moved by the solenoid $r^1$ against the action of the spring $q^1$ from its initial angular position to a second angular position in which the valve-operating stems $c^1$, $d^1$ are in line with the gaps 33 between the ends of the cam projections 31, 32, and is retained in this position by the engagement of a detent 15$^1$ with a complementary recess 16$^1$ in the outer periphery of the hollow shaft 22, the detent being provided on a pivoted lever 12$^1$ which is loaded by a spring 35 and is movable by another solenoid 41.

It will be seen from the drawings that the above described angular movement of the cam $m^1$ has no effect on the valve-operating stems $c^1$, $d^1$.

Figure 17:
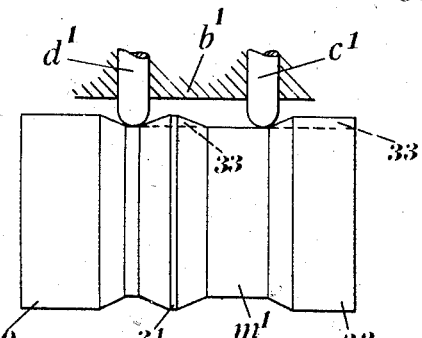

When it is required to change from the first to the second speed-ratio of the epicyclic mechanism, the cam $m^1$ is moved by the hand lever $j^1$ to the axial position shown in Figure 17. If the speed of the vehicle now exceeds a predetermined limit the governor above mentioned causes the solenoid 41 to be energised, whereupon the lever 12$^1$ is moved to disengage the detent 15$^1$ from the recess 16$^1$ in the shaft 22. The cam $m^1$ is now returned by the spring $q^1$ to its initial angular position.

Figure 18:
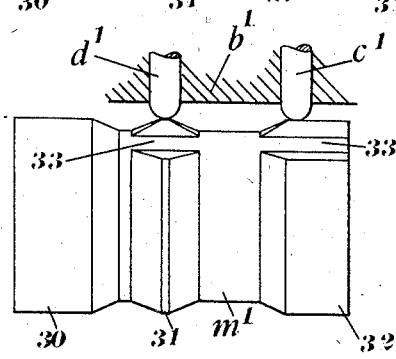

If it is now required to change from the second to the third speed-ratio of the epicyclic mechanism, the cam $m^1$ is moved by the hand lever $j^1$ to the position shown in Figure 18, causing the valve-operating stems $c^1$, $d^1$ to be moved to their inner positions by the cam projections 31, 32. With the hand lever $j^1$ retained in the position corresponding to the third speed-ratio, this ratio remains effective so long as the speed of the vehicle exceeds the said limit. But in the event of the speed of the vehicle falling below this limit the governor-controlled solenoid $r^1$ is again energised, causing the cam $m^1$ to be moved against the action of the spring $q^1$ to the second angular position above mentioned. During this movement of the cam the valve-operating stems $c^1$, $d^1$ are allowed by the gaps 33 between the ends of the cam protuberances 31, 32 to move into their outer positions and thereby cause the speed-ratio of the epicyclic mechanism to change back from third to second. When the vehicle speed again exceeds the said limit, the cam $m^1$ is returned as above described to its initial angular position, causing the valve-operating stems $c^1$, $d^1$ to be moved to their inner positions by the cam projections 31, 32, so as to re-instate the third speed-ratio of the epicyclic mechanism.

Figure 19:
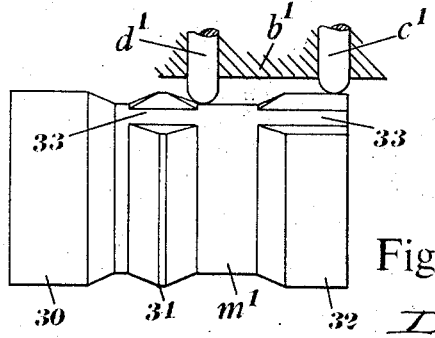

If it is now required to change the speed-ratio of the epicyclic mechanism from the third to the fourth, the cam $m^1$ is moved by the hand lever $j^1$ to the axial position shown in Figure 19, allowing the valve stem $d^1$ to move to its outer position. With the hand lever $j^1$ retained in the position corresponding to the fourth speed-ratio, this ratio remains effective so long as the vehicle speed exceeds the above mentioned limit. But in the event of the vehicle speed falling below this limit, the cam $m^1$ is again moved as above described to its second angular position. During this movement of the cam the valve-operating stem $c^1$ is allowed by the gap 33 between the ends of the cam projection 32 to move into its outer position and thereby cause the speed-ratio of the epicyclic mechanism to change back from the fourth to the second.

As in the previously described example the hand lever $j^1$ can be set in the position corresponding to the third speed-ratio of the epicyclic mechanism if, as is ordinarily the case, the second speed-ratio is to be employed for starting the vehicle. With the hand lever in this position the second speed-ratio is effective when the vehicle is being started and persists until the vehicle speed exceeds a predetermined limit, whereupon the third speed-ratio will be brought into action automatically. Also subsequent changes between the third and second speed-ratios can be effected automatically in response to the speed of the vehicle.

At the end remote from the hand lever $j^1$ the inner shaft $h^1$ is formed with circumferential grooves 36 to provide a ratchet for engagement by a spring-loaded pawl 19$^1$ pivoted on one end of a lever 20$^1$. This lever 20$^1$ is operable by movements of the accelerator pedal beyond the normal "full throttle" position, and is arranged so that the pawl 19$^1$ can serve to impart step-by-step movements to the cam $m^1$ through the shaft $h^1$ in response to movements of the lever, these movements being such that changing down from any speed-ratio to a lower one can be effected through the accelerator pedal.

The valve-operating stems $c^1$, $d^1$ are slidably supported in and project at one end from a casing $b^1$ which contains a pair of spring-loaded valves 37, the latter being operable by the inner ends of the stems, and being adapted to co-operate with seatings 38 in the casing. The latter is connected to the epicyclic mechanism to be controlled by pipes $e^1$, $f^1$, and to a hydraulic accumulator or other source of fluid pressure 39 by a pipe 40. Inward movements of the stems $c^1$, $d^1$, which are of hollow form, serve to move the valves 37 off their seatings 38. In this position of the valves 37 the pipes $e^1$, $f^1$ communicate with the pipe 40. Return movements of the stems $c^1$, $d^1$ allow the valves 37 to move on to their seatings, and cause the inner ends of the stems to move slightly away from the valves. In this condition communication of the pipes $e^1$, $f^1$ with the pipe 40 is interrupted, and communication between the pipes $e^1$, $f^1$ and a fluid discharge passage or passages 41 in the casing $b^1$ is established through the hollow interiors of the stems $c^1$, $d^1$, the latter being provided near their lower ends with lateral apertures 42 adapted to communicate with the said passage or passages when the stems are in their outer positions.

In the case where the mechanism to be controlled comprises a two-speed ratio epicyclic unit combined with a supplementary two-speed gearbox of the normal hand lever operated type, I may arrange that the hand change movement utilized for passing into or from the lower ratio of the said normal gear change unit, shall concurrently effect the required valve movement for effecting the necessary correlative change in the epicyclic unit.

In some cases also I may employ more than one cam as above described for controlling the speed ratios, and more particularly in those cases where the driving mechanism is adapted to provide more than four forward speed ratios.

By this invention I am able to effect both manual and automatic control of the speed ratios in a very simple and convenient manner. The invention is not, however, restricted to the examples above described as subordinate details may be varied to suit different requirements. Thus, when the control of the variable speed mechanism is effected electrically, the cam may operate a switch or switches. Moreover, the invention may be applied to variable speed mechanisms other than those of the epicyclic type.

Having thus described my invention what I claim as new and desire to secure by Letters Patent is:

1. Control means for variable speed vehicle driving mechanism, comprising the combination with movable members for controlling the speed ratio of the mechanism, of cam means which has rotational and axial modes of freedom, the cam means being shaped and arranged to cooperate with the said members so that the latter are responsive to both rotational and axial movements of the cam means, manually operable means for actuating the cam means in one of its modes of freedom, means responsive to the speed of the vehicle for actuating the cam means in its other mode of freedom, and additional means including pawl-and-ratchet mechanism for actuating the cam means in one of its modes of freedom.

2. Control means for variable speed vehicle driving mechanism, comprising the combination with movable members for controlling the speed ratio of the mechanism, of cam means which has rotational and axial modes of freedom, the cam means being shaped and arranged to cooperate with the said members so that the latter are responsive to both rotational and axial movements of the cam means, manually operable means for actuating the cam means in one of its modes of freedom, means responsive to the speed of the vehicle for actuating the cam means in its other mode of freedom, and additional means for actuating the cam means in one of its modes of freedom, the said additional means comprising in combination a manually operable lever, and pawl-and-ratchet mechanism through which movement can be imparted from the lever to the cam.

EDGAR JOSEPH DE NORMANVILLE.

REFERENCES CITED

The following references are of record in the file of this patent:

UNITED STATES PATENTS

| Number | Name | Date |
| --- | --- | --- |
| 1,246,049 | Burrows | Nov. 13, 1917 |
| 1,990,690 | Hantschel et al. | Feb. 12, 1935 |
| 2,084,578 | Dunn et al. | June 22, 1937 |
| 2,109,615 | Durham | Mar. 1, 1938 |
| 2,151,714 | Davesi | Mar. 28, 1939 |
| 2,159,339 | Neracher et al. | May 23, 1939 |
| 2,160,385 | Kraemer et al. | May 30, 1939 |
| 2,183,761 | Aspinwall et al. | Dec. 19, 1939 |
| 2,352,212 | Lang et al. | June 27, 1944 |

FOREIGN PATENTS

| Number | Country | Date |
| --- | --- | --- |
| 522,970 | Great Britain | July 2, 1940 |